United States Patent [19]
Benson et al.

[11] Patent Number: 5,742,461
[45] Date of Patent: Apr. 21, 1998

[54] CLEANING CARTRIDGE FOR A TAPE DRIVE

[75] Inventors: Michael N. Benson, San Jose; James F. Taylor, Santa Cruz, both of Calif.

[73] Assignee: Microclean, Inc., San Jose, Calif.

[21] Appl. No.: 384,104

[22] Filed: Feb. 6, 1995

[51] Int. Cl.⁶ .......................... G11B 5/10; G11B 5/127; G11B 5/41

[52] U.S. Cl. ............................ 360/128; 360/137

[58] Field of Search ........................ 360/128, 137

[56] References Cited

U.S. PATENT DOCUMENTS

| | | |
|---|---|---|
| 4,442,468 | 4/1984 | d'Alayer de Costemore d'Arc .... 360/128 |
| 4,454,550 | 6/1984 | Clausen et al. ........................ 360/128 |
| 4,454,551 | 6/1984 | Clausen et al. ........................ 360/128 |
| 4,594,629 | 6/1986 | d'Alayer de Costemore d'Arc .... 360/128 |
| 4,706,147 | 11/1987 | Muller ................................ 360/128 |
| 4,816,952 | 3/1989 | Clausen .............................. 360/128 |
| 4,894,743 | 1/1990 | Clausen .............................. 360/128 |
| 5,021,911 | 6/1991 | Kingsbury .......................... 360/128 |
| 5,353,184 | 10/1994 | Clausen .............................. 360/128 |
| 5,420,737 | 5/1995 | Clausen .............................. 360/128 |

*Primary Examiner*—Stuart S. Levy
*Assistant Examiner*—Adriana Giordana
*Attorney, Agent, or Firm*—Flehr Hohbach Test Albritton & Herbert LLP

[57] ABSTRACT

A cassette for cleaning the capstan and read/write head of a tape drive. The capstan drives a mechanism for cleaning the read/write head, while a cleaning pad simultaneously engages the capstan from the side. As the cleaning cassette is inserted into the tape drive, the engaging extension of the tape drive activates a lever or motor system to move the capstan cleaning pad from a location within the cassette to a cleaning position in contact with the capstan.

17 Claims, 4 Drawing Sheets

CLEANING CARTRIDGE FOR A TAPE DRIVE

BACKGROUND OF THE INVENTION

The instant invention relates to devices for cleaning the parts of a machine for reading and/or writing tapes which come into contact with the tape. In particular, the invention relates to apparatus for cleaning the read/write head and capstan of a magnetic tape drive.

The process of writing or reading a tape on a tape drive results in certain parts of the machine coming into contact with the tape. The contact with the tape tends to leave magnetic medium particles, dust particles and particles of other types on the tape head. This particulate residue, if left undisturbed, can build to substantially impair the performance of the tape machine. Accordingly, there is a recognized need for an apparatus which cleans the parts of the drive to remove this particulate residue.

The prior art contains a cassette which cleans the read/write head, the capstans and rollers of a tape drive. See U.S. Pat. No. 4,594,629, issued to Stephane M. d'Alayer de Costemore d'Arc on Jun. 10, 1986. However, such a cassette presupposes a drive mechanism which is distinct from the capstan and rollers of the tape drive. In an arrangements where the drive mechanism and the capstan are not distinct but are the same element, this prior art cassette cleaner will not function. An example of a capstan drive device is the Tracker 250 sold by Hewlett-Packard.

The prior art also contains a cassette which will operate in a capstan-drive tape machine. U.S. Pat. No. 4,894,743, issued to Elvind Clausen on Jan. 16, 1990, discloses such a device. The Clausen device makes use of the drive capstan, normally used to drive the tape, to drive the read/write head cleaning assembly instead. Because of the need to maintain a friction contact with the drive capstan, the Clausen cassette does not attempt to clean the read/write head and the drive capstan simultaneously. To clean the drive capstan, the Clausen device employs a second element which cleans the drive capstan but which also destroys the friction contact with the drive capstan such that the read/write head cleaning assembly cannot clean the read/write head. Therefore, in order for a user of a Clausen cassette to clean both the read/write head and the drive capstan of the tape machine, the user must first insert the cassette with the read/write head cleaning element attached, clean the read/write head, remove the cassette, disassemble the cassette to remove the element adapted for engaging the drive capstan (to move the read/write head cleaning assembly), and replace that element with another adapted to clean the drive capstan. This insertion-removal-disassembly-assembly-reinsertion process is obviously cumbersome as it requires multiple steps to effect complete cleaning.

In view of the foregoing, an object of this invention is to provide a tape cleaning apparatus which will work in a capstan-drive tape drive and which will clean both the read/write head and the drive capstan simultaneously without the user having to manipulate the apparatus in any way.

Another object of this invention is to provide an apparatus which reduces skipping of a cleaning element across the read/write head, thereby improving cleaning efficiency. Prior art devices have been found to move their cleaning mechanism too rapidly over the read/write head. This excessively rapid movement results in the cleaning mechanism skipping, and the skipping in turn results in less than optimal cleaning efficiency per pass over the read/write head.

These and other objects of the invention will be readily discernible to one of skill in the art on reading this disclosure.

SUMMARY OF THE INVENTION

The invention includes, in a first embodiment, a contact cleaner of the capstan and a conveyor, attached to the capstan contact cleaner. The conveyor is mounted at a position where it can move the capstan contact cleaner from a retracted position to an extended position adjacent the capstan. This embodiment uniquely permits the capstan contact cleaner, when not in use, to be contained internally allow the cassette and to conform to the form factor for a tape cassette, while permitting the very insertion of the apparatus into the tape drive to correctly position the capstan contact cleaner for cleaning. In preferred arrangements, the conveyor can be hand operated, can include a motor, or can include a lever system actuated by insertion of the tape drive's engaging extension into the apparatus.

In another preferred embodiment, the invention further includes a switch with first and second settings. At the first setting, the switch permits the conveyor to move the capstan contact cleaner from the retracted position to the extended position. At the second setting, the switch prevents the conveyor from moving the capstan contact cleaner from the retracted to the extended position. With a lever-system conveyor, the switch can be elliptical, at the first setting presenting its minor axis to the lever system, thereby permitting the lever system to move the capstan contact cleaner from the retracted position to the extended position. At the second setting, the elliptical switch presents its major axis to the lever system, thereby physically preventing the lever system from moving the capstan contact cleaner from the retracted to the extended position. In some tape drives, access to the side of the capstan for cleaning or other purposes is severely restricted. In those cases, embodiments of the invention may include such a lockout switch to prevent the deployment of the capstan cleaning mechanism beyond the boundary of the cassette.

The invention also includes, in one embodiment, a contact cleaner for the read/write head and a mechanical variable resistor, coupled to the read/write head contact cleaner. The variable resistor is variably resistant to compression and/or extension and is positioned where it can bias the read/write head contact cleaner against the read/write head. Here, the capstan contact cleaner is disposed adjacent the capstan at the same time the read/write head contact cleaner is disposed against the read/write head. In this manner, the invention succeeds in cleaning both the capstan and the read/write head simultaneously, without any disassembly, assembly or other user manipulation of the cleaning cassette.

The read/write head contact cleaner and the capstan contact cleaner are preferably replaceable pads. Replaceable pads help extend the life and maintain the cleaning efficiency of the cleaning cartridge, at low cost.

With the variable resistor, the invention is also able to maintain effective pressure of the read/write head contact cleaner against the read/write head, even though the head may not be flat. This variable resistor preferably includes a spring, braced against a curvilinear stay at one end and attached to the read/write head cleaning mechanism at the other. The stay presents a concave surface to the spring. Alternatively, the variable resistor can include a rubber band. With this embodiment, the invention uses greater force to impel the read/write head contact cleaner against the read/write head at those positions where a convex read/write head curves away from the read/write head contact cleaner.

An oscillator is included to move the read/write head contact cleaner back and forth across the read/write head and is driven by the capstan. This obviates the need for manual operation or a self-contained power supply. The oscillator uses at least three gears to gear down the movement of the drive capstan before the movement is applied to clean the read/write head. The advantage here is the reduction in the tendency of the read/write head contact cleaner to skip across an uneven read/write head surface when the read/write head contact cleaner is moving too rapidly. In preferred embodiments, the read/write head contact cleaner passes over the read/write head less than sixty times per minute, between 40 and 50 passes per minute and about 45 passes per minute. The oscillator moves the read/write head contact cleaner at about one pass per twelve rotations of the capstan.

DESCRIPTION OF THE PREFERRED EMBODIMENT

Figure 1:
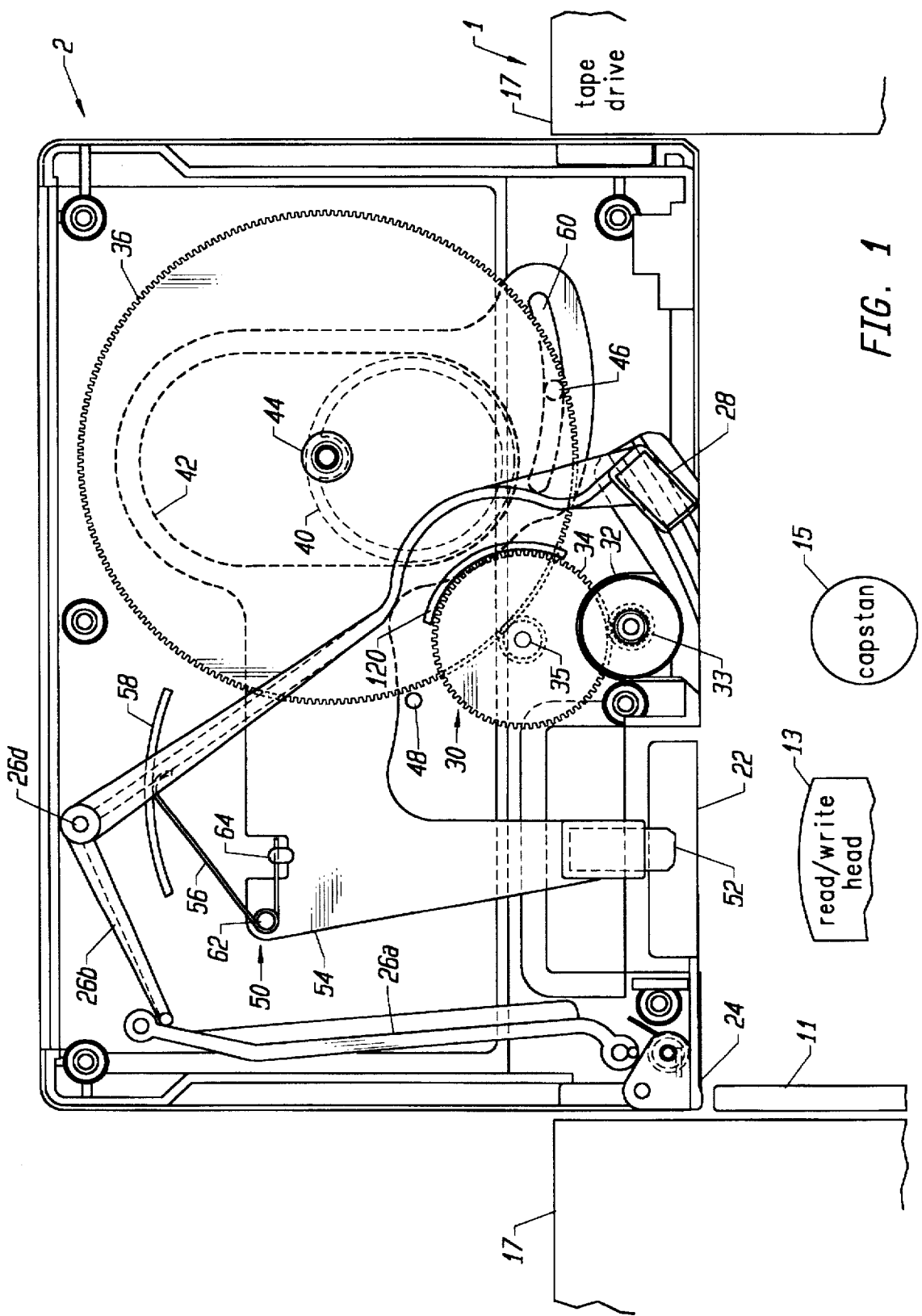
FIG. 1 is a top elevation view of an embodiment of the invention partially inserted into a tape drive.

FIG. 1 shows cassette 2 of a preferred embodiment of the invention as cassette 2 is being inserted into tape drive 1. Tape drive 1 has engaging extension 11, read/write head 13, capstan 15 and guide walls 17. (Tape drive 1 is not a part of the invention.) Cassette 2 has door 22, lever 24, capstan pad levers 26a and 26b, and cleaning pad 28. Cassette 2 also has drive mechanism 30 which consists of transmission gears 32, 34 and 36, circular cam 40, cam slot 42 and pin 44. FIG. 1 also shows head cleaning assembly 50. Head cleaning assembly 50 consists of cleaning pad 52, pad carriage 54, spring 56, pin 62, pin slot 60 and clip 64. Rising from the base of cassette 2 are pivot 26d, stop pins 46 and 48, stay 58 and pins 33 and 35.

Lever 24 is integral to door 22 (though, of course, door 22 may be absent in other embodiments) and is in contact with capstan pad lever 26a. Capstan pad lever 26a is in contact with one end of capstan pad lever 26b while cleaning pad 28 is mounted on the other end of capstan lever 26b. Transmission gear 34, mounted on pin 35, intermeshes with transmission gear 32, mounted on pin 33, and transmission gear 36. Transmission gear 36 and cam 40 are bolted together by means of pin 44. Cam 40 is located within cam slot 42. Cleaning pad 52 of head cleaning assembly 50 is located on that portion of pad carriage 54 located just within cassette 2 behind door 22. One end of spring 56 is braced against an elongated concave curvilinear surface provided by a stay 58 while the other end of spring 56 is attached to pad carriage 54 at pin 62 and clip 64.

Figure 2:
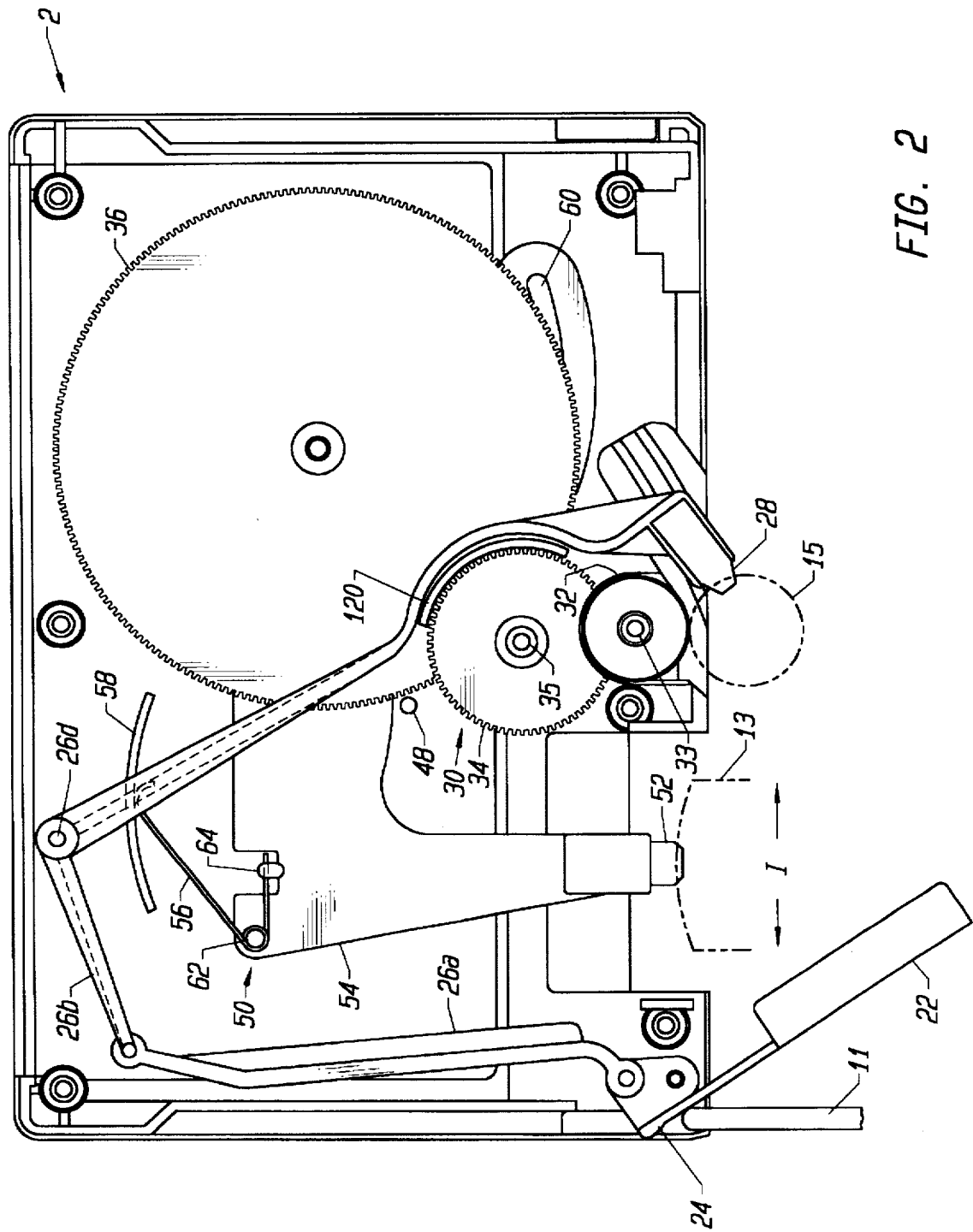
FIG. 2 is a top elevation view of an embodiment of the invention fully inserted into a tape drive.

FIG. 2 shows the invention fully inserted into a tape drive. Identical elements in FIGS. 1 and 2 are given identical reference numbers.

The operation of this embodiment of the invention is as follows. When cassette 2 is partially inserted into tape drive 1 as in FIG. 1, lever 24 is not in contact with engaging extension 11. Accordingly, door 22 is closed and capstan pad levers 26a and 6b are not actuated. Because capstan pad levers 26a and 26b are not actuated, capstan cleaning pad 28 remains in its initial, retracted position within cassette 2. With capstan cleaning pad 28 in its initial, retracted position, cassette 2 maintains a form factor which tape drive 1 may impose to insure that cassette 2 is properly aligned when inserted.

As cassette 2 is inserted further into tape drive 1, engaging extension 11 comes into contact with lever 24. As engaging extension 11 applies contact pressure to lever 24, lever 24 begins to open door 22 and to actuate capstan pad lever 26a. Guide walls 17 insure the correct alignment of cassette 2 and engaging extension 11 for engaging extension 11 to contact lever 24.

When cassette 2 is fully inserted, as in FIG. 2, engaging extension 11 has fully actuated lever 24. Consequently, door 22 is fully open and capstan lever 26a is fully actuated. Because of this displacement of capstan lever 26a, capstan lever 26b is also fully actuated, i.e., capstan lever 26b has rotated on pivot 26d, extending capstan cleaning pad 28 beyond cassette 2 and into contact with capstan 15 of tape drive 1. As capstan 15 rotates while in contact with capstan cleaning pad 28, capstan cleaning head 28 removes debris from capstan 15.

Engaging extension 11's opening of door 22, by means of lever 24, is known in the art. Typically, engaging extension 11 opens door 22 of a tape cartridge (not shown) to permit read/write head 13 access to the tape (not shown) in that tape cartridge. However, the use of engaging extension 11 and lever 24 to move capstan cleaning pad 28 into contact with capstan 15 is a part of the disclosed embodiment.

When cassette 2 is fully inserted, capstan 15 is in physical contact with transmission gear 32. By friction between the surface of capstan 15 and that of transmission gear 32, capstan 15 succeeds in turning transmission gear 32, which turns transmission gear 34, which, in turn, turns transmission gear 36. In the preferred embodiment, the result of the tri-partite gearing is a reduction in the speed of capstan 15's turning of transmission gear 36.

As transmission gear 36 turns, cam 40 is forced to turn in cam slot 42, causing head cleaning assembly 50 to move. Pin 46 in pin slot 60 and pin 48 together constrain the movement of pad carriage 54 to a substantially back-and-forth motion as indicated by arrows I in FIG. 2.

When cassette 2 is fully inserted, read/write head 13 of tape drive 1 contacts cleaning pad 52 of cassette 2. Cleaning pad 52 succeeds in wiping read/write head 13 in a back-and-forth motion and thereby cleans read/write head 13. The slower turning of transmission gear 36 described above effects a slower turning of cam 40 and reduces the skipping of cleaning pad 52 across read/write head 13 due to high speed motion of cleaning pad 52.

Figure 3:
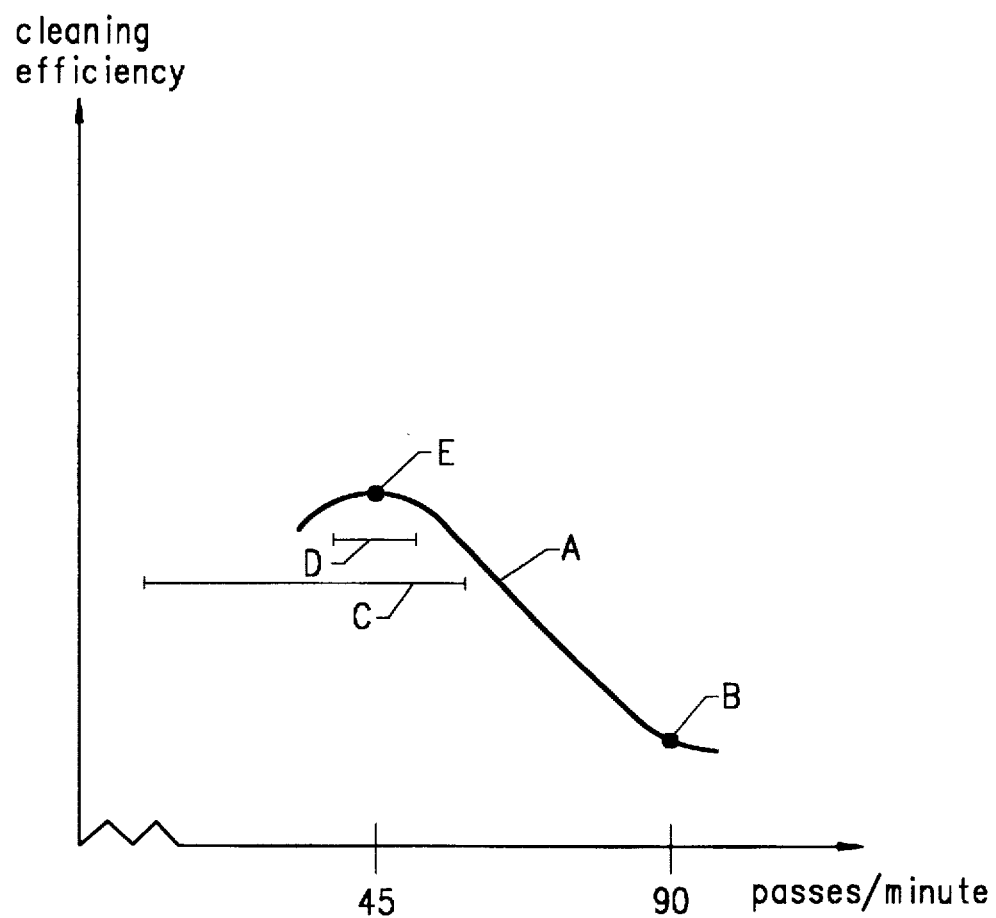
FIG. 3 is a graph of the relationship between passes per minute and cleaning efficiency.

FIG. 3 illustrates the relationship of passes per minute ("ppm") to cleaning efficiency (i.e., reduced skipping). Because not all data points in the relationship are currently known, curve A of FIG. 3 is the best understanding at this time. Curve A shows the trade-off between the speed of cleaning and cleaning efficiency: If the ppm rate is too high, much skipping and little cleaning will occur. On the other hand, with a very low ppm rate, very little skipping and more cleaning will occur. Between the two extremes is a balance of minimal-to-no skipping and appreciable cleaning. Point B, at 90 complete back-and-forth passes across the cleaning head per minute, represents the lower cleaning limit of the prior art. Empirical data indicates that less than one pass per second sixty passes per minute significantly reduces skipping over the prior art. This range is illustrated as range C. Forty to fifty passes/minute is the preferred range, range D, with about 45 passes/minute, point E, being optimal. The preferred gearing ratio is twelve capstan turns per single pass.

Braced against a elongated curvilinear concave surface provided by stay 58 and secured to pad carriage 54 at pins 62 and clip 64, spring 56 biases cleaning pad 52 against read/write head 13. Spring 56 helps to insure that cleaning pad 52 remains in effective contact with read/write head 13 during the back-and-forth cleaning motion. In particular, in some tape drives, read/write head 13 will present a somewhat convex surface to cleaning pad 52, i.e., read/write head 13 will have a surface curved away from cleaning pad 52 when cleaning pad 52 is at the two ends of its back-and-forth motion. Curvilinear stay 58, therefore, presents a concave surface to head cleaning assembly 50 and to spring 56, as it rides along such surface allowing spring 56 to push head cleaning assembly 50 and cleaning pad 52 with greater force against read/write head 13 where read/write head 13 curves away from cleaning pad 52. Thus the curvilinear surface of stay 58 helps to compensate for the convex surface of read/write head 13.

Figure 4:
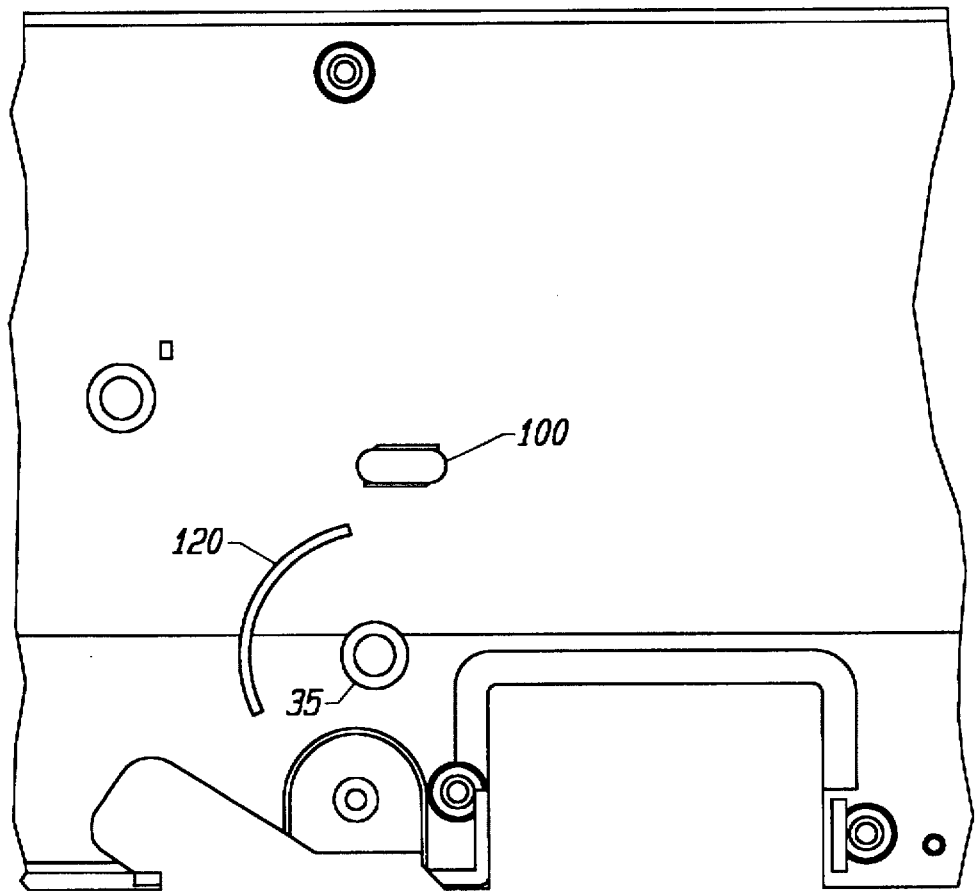
FIG. 4 is a simplified, top elevation view of an embodiment of the invention including a lockout switch.

In recognition of the fact that some tape drives do not allow side access to the capstan as contemplated by this invention, the cassette of the invention can also include a mechanism for disabling the deployment of the capstan cleaning mechanism. FIG. 4 shows lockout switch 100 of a cassette of the invention. For the sake of clarity, many of the features of the cassette have not been shown in FIG. 4. However, barrier 120 and pin 35 are present for orientation purposes with respect to FIGS. 1 and 2. Lockout switch 100 is located near lever 26b. Lockout switch 100 is flush with the surface of cassette 2 in order to permit user access to the switch while maintaining any form factor which the tape drive may impose.

With its elliptical shape, lockout switch 100 is significantly longer than it is wide. In an initial position allowing the deployment of the capstan cleaning mechanism, the long axis of the oval of lockout switch 100 is substantially parallel to nearby lever 26b. In this first orientation, lockout switch 100 does not interfere with the movement of lever 26b, and cleaning pad 28 can extend beyond cassette 2. In its second position, a 90° rotation from the initial position, lockout switch 100 has its short axis substantially parallel nearby lever 26b and, therefore, its long axis perpendicular to lever 26b. In this second position, when lever 26b moves to extend cleaning pad 28 beyond cassette 2, lockout switch 100 interferes with that movement and prevents lever 26b from extending cleaning pad 28 beyond cassette 2. In this way, this embodiment of enables one to disable the invention disables the deployment of the capstan cleaning mechanism in those drives which do not permit side access to the capstan.

The present invention provides a significantly improved apparatus for cleaning parts of a tape drive which come into contact with the tape. It is to be understood that the above description is intended to be illustrative and not restrictive. Many changes and modifications to the invention will become apparent to those of skill in the art. For example, the use of a carriage assembly which employs a mechanism for breaking up and/or blowing away debris, or which employs a mechanism for attracting debris based on electric charges is foreseeable. Also, there are many ways to bias the cleaning pad against the read/write head or other appropriate part of a tape drive.

What is claimed is:

1. An apparatus for cleaning a device which reads data from and/or writes data onto tape, said read/write device including a read/write head and a capstan, said apparatus comprising:

a first contact cleaner of said capstan;

a conveyor, attached to said first contact cleaner, said conveyor mounted at a position where said conveyor can move said first contact cleaner from a first, retracted position to a second, extended position adjacent said capstan, wherein said read/write device further includes an engaging extension and said conveyor comprises a lever system actuated by insertion of said engaging extension into said apparatus, and wherein said lever system comprises:

a first lever;

a second lever, having first and second ends, said first end of said second lever in contact with said first lever; and a third lever, having first and second ends, said first end of said third lever in contact with said second end of said second lever, said first contact cleaner mounted on said second end of said third lever;

wherein said first, second and third levers are mounted at positions where said engaging extension actuates said first lever, said first lever actuates said second lever, said second lever actuates said third lever, and said third lever moves said first contact cleaner from said first, retracted position to said second, extended position adjacent said capstan.

2. The apparatus of claim 1 wherein the actuation of said lever system moves said first contact cleaner from said first, retracted position to said second, extended position adjacent said capstan.

3. The apparatus of claim 1 wherein said apparatus further includes a second contact cleaner of said read/write head and said first lever is integral to a door protecting said second contact cleaner.

4. The apparatus of claim 3 wherein the actuation of said lever system moves said first contact cleaner from said first, retracted position to said second, extended position adjacent said capstan.

5. An apparatus for cleaning a device which reads data from and/or writes data onto tape, said read/write device including a read/write head and a drive capstan, said apparatus comprising:

A) a housing having:
1. a first contact cleaner for cleaning said drive capstan, said cleaner having a first position in the interior of said housing; and
2. a second contact cleaner for cleaning said read/write head; and B. a conveyor for projecting said first contact cleaner beyond the boundary of said housing to clean said drive capstan at the same time said second contact cleaner is disposed against and cleans said read/write head, and wherein said capstan also drives said conveyor at the same time said first contact cleaner cleans said capstan.

6. The apparatus of claim 5 further including a housing for said first and second contact cleaners and a conveyor within said housing to which said first contact cleaner is attached, which conveyor is configured and mounted at a position to move said first contact cleaner from a first, retracted position within the interior of said housing to a second, extended position beyond the boundary of said housing and adjacent said drive capstan.

7. The apparatus of claim 6 wherein said read/write device further includes an engaging extension and said conveyor comprises a lever system actuated by insertion of said engaging extension into said apparatus, the actuation of said lever system moving said first contact cleaner from said first, retracted position within the interior of said housing to said second, extended position beyond the boundary of said housing.

8. The apparatus of claim 6 further comprising a switch having first and second settings, said switch at said first setting permitting said conveyor to move said first contact cleaner from said first, retracted position within the interior of said housing to said second, extended position beyond the boundary of said housing, said switch at said second setting preventing said conveyor from moving said first contact cleaner from said first, retracted position to said second, extended position.

9. The apparatus of claim 5 wherein said apparatus further comprises:

an oscillator, configured and positioned to move said second contact cleaner back and forth across said read/write head, said oscillator driven by said capstan.

10. The apparatus of claim 9 wherein said oscillator comprises at least three gears to ratio down the movement provided by said capstan.

11. The apparatus of claim 9 wherein said oscillator is configured and positioned to move said second contact cleaner at less than sixty passes per minute.

12. The apparatus of claim 9 wherein said oscillator is configured and positioned to move said second contact cleaner at between 40 and 50 passes per minute.

13. The apparatus of claim 9 wherein said oscillator is configured and positioned to move said second contact cleaner at about 45 passes per minute.

14. The apparatus of claim 9 wherein said capstan rotates, and said oscillator is positioned and configured to move said second contact cleaner at one pass per twelve rotations of said capstan.

15. The apparatus of claim 5 further including a variable resistor configured and mounted at a location to bias said second contact cleaner against said read/write head.

16. The apparatus of claim 15 wherein said variable resistor comprises a spring, braced against an elongated curvilinear surface of a stay at one end and coupled to said second contact cleaner at the other end.

17. The apparatus of claim 16 wherein said stay presents an elongated concave surface to said spring.

* * * * *